United States Patent
Hogan

(10) Patent No.: US 6,757,307 B2
(45) Date of Patent: Jun. 29, 2004

(54) SELF SEEDING PULSED NON-LINEAR RESONANT CAVITY

(76) Inventor: Josh N. Hogan, 620 Kingswood Way, Los Altos, CA (US) 94022

( * ) Notice: Subject to any disclaimer, the term of this patent is extended or adjusted under 35 U.S.C. 154(b) by 0 days.

(21) Appl. No.: 09/733,708

(22) Filed: Dec. 8, 2000

(65) Prior Publication Data

US 2002/0071645 A1 Jun. 13, 2002

(51) Int. Cl.[7] .............................................. H01S 3/067
(52) U.S. Cl. .............................. 372/23; 372/72; 372/94; 372/99
(58) Field of Search ........................ 372/6, 23, 70–72, 372/92, 94, 97, 99, 69, 75, 25

(56) References Cited

U.S. PATENT DOCUMENTS

| | | | |
|---|---|---|---|
| 4,829,529 A | * | 5/1989 | Kafka ............................ 372/6 |
| 4,835,778 A | * | 5/1989 | Kafka et al. .................... 372/6 |
| 5,390,211 A | * | 2/1995 | Clark et al. .................... 372/22 |
| 5,912,910 A | * | 6/1999 | Sanders et al. ................ 372/22 |
| 6,215,800 B1 | | 4/2001 | Komine |
| 6,353,499 B2 | | 3/2002 | Zanoni et al. |
| 2002/0012163 A1 | | 1/2002 | Zanoni et al. |
| 2002/0071457 A1 | * | 6/2002 | Hogan ......................... 372/23 |

* cited by examiner

*Primary Examiner*—Minh-Loan Tran
(74) *Attorney, Agent, or Firm*—Deborah Neville

(57) ABSTRACT

This invention provides a means for generating multiple wavelengths in an integrated manner using a resonant cavity containing dispersion shifted non-linear medium and coupled to a pulsed laser source. The dispersion shifted non-linear medium is seeded by at least some of the desired wavelengths. The laser source emits radiation at a particular wavelength and is pulsed in a manner synchronously related to the round trip time of the resonant cavity. By means of wave mixing, such as four wave mixing, the dispersion shifted non-linear medium produces a set of discrete wavelengths. The reflective elements of the resonant cavity are designed to contain the radiation of the laser sources within the resonant cavity and to transmit an equal amount of each of the generated set of wavelengths.

93 Claims, 12 Drawing Sheets

SELF SEEDING PULSED NON-LINEAR RESONANT CAVITY

BACKGROUND OF THE INVENTION

This invention relates to the area of optical sources which provide output radiation at a multiplicity of wavelengths. This has application in such areas as the optical communications industry where Dense Wavelength Division Multiplexing (DWDM) achieves high data rate transmission by independently modulating data on to a multiplicity of optical beams, each with a different wavelength. These optical beams are then combined and propagated down a single optical fiber. Since the different wavelengths do not significantly interfere with each other the multiple wavelengths are effectively independent communications channels.

Multiple wavelength sources are typically generated by having multiple laser diodes each designed to emit at one of the required wavelengths. Each laser diode may be fabricated so that it emits at a particular wavelength as in the case of Distributed Feed Back (DFB) lasers where the emitting wavelength is determined by the physical spacing of a distributed Bragg grating that is part of the laser diode. Alternately, laser diodes may be fabricated that are capable of emitting over a broad wavelength range and are tuned to a particular wavelength by means of precision temperature control or other means.

An alternative approach to generating multiple wavelengths is to generate a continuum of wavelengths by applying a high power single wavelength source for four wave mixing in a nonlinear medium such as fiber. The non-linear or anhannonic characteristics allow the transformation of the source or pump radiation to other wavelengths.

High power is typically achieved be using a pulsed optical source so that high peak power can be attained with relatively low average power. The spectrum of the input optical pulse will be broadened to provide a continuum of wavelengths. The width of this continuum can be large if long lengths of conventional fiber are used. More recently "photonic crystal fiber" allows an extremely large continuum range to be generated with a relatively short length of fiber. A set of individual wavelengths can be generated from this continuum by routing the optical beam through a set of optical filters, such as distributed fiber gratings. This approach of generating a set of multiple wavelengths by filtering a continuum is inherently inefficient because the wavelengths filtered out essentially are wasted energy.

Another approach described at the SPIE Conference on Optical Fiber Communications, Taipei, Taiwan, July 1998 in a paper titled A Multi-wavelength WDM Source Generated by Four-Wave-Mixing in a Dispersion-Shifted-Fiber by Keang-Po Ho and Shien-Kuei Liaw is to combine the output of two continuous;wave laser diodes that have slightly different wavelengths, amplify the combined signal with a high power Erbium Distributed Fiber Amplifier (EDFA) and apply this to a dispersion shifted fiber for four way mixing to produce a set or comb of wavelengths, whose wave length separation is determined by the difference in wavelength of the two seed laser diodes. Dispersion of a medium refers to the variation of the speed of propagation of radiation with wavelength within the medium. Typically the optical dispersion of a medium exhibits one or more minima at specific wavelengths around which the variation of speed of propagation with wavelength is small. Dispersion shifted media, such as, dispersion shifted fiber is designed to have zero dispersion close to the desired operating wavelength. Here, dispersion shifted medium is also intended to include the situation where a minimum coincides with the desired operating wavelength without specific modification.

This approach, however, still requires a physically long amount of dispersion shifted medium, which requires the system to be physically large which makes it more subject to environmental changes and not compatible with a requirement of being compact. It also requires the use of an expensive EDFA.

Therefore there is an unmet need for an efficient compact method and apparatus for generating a set or comb of wavelengths in manner that is compatible with low cost fabrication and which provides an integrated source of radiation at multiple wavelengths.

SUMMARY OF THE INVENTION

This invention provides a means for generating multiple wavelengths in an integrated manner using a resonant cavity containing dispersion shifted non-linear medium and coupled to a pulsed laser source. The dispersion shifted non-linear medium is seeded by at least some of the desired wavelengths. The laser source emits radiation at a particular wavelength and is pulsed in a manner synchronously related to the round trip time of the resonant cavity. By means, such as four wave mixing, the dispersion shifted non-linear medium produces a set of discrete wavelengths. The reflective elements of the resonant cavity are designed to contain the radiation of the laser sources within the resonant cavity and to transmit an equal amount of each of the generated set of wavelengths. This invention provides an apparatus for and method of generating repetitive pulsed radiation with a multiplicity of discrete wavelengths, which includes positioning an optical processing medium in a resonant cavity with reflective elements, generating repetitive pulsed radiation from a pulsed laser source in a pump cavity with reflective elements and coupling the resonant and pump cavities.

DETAILED DESCRIPTION OF THE INVENTION

Figure 1:
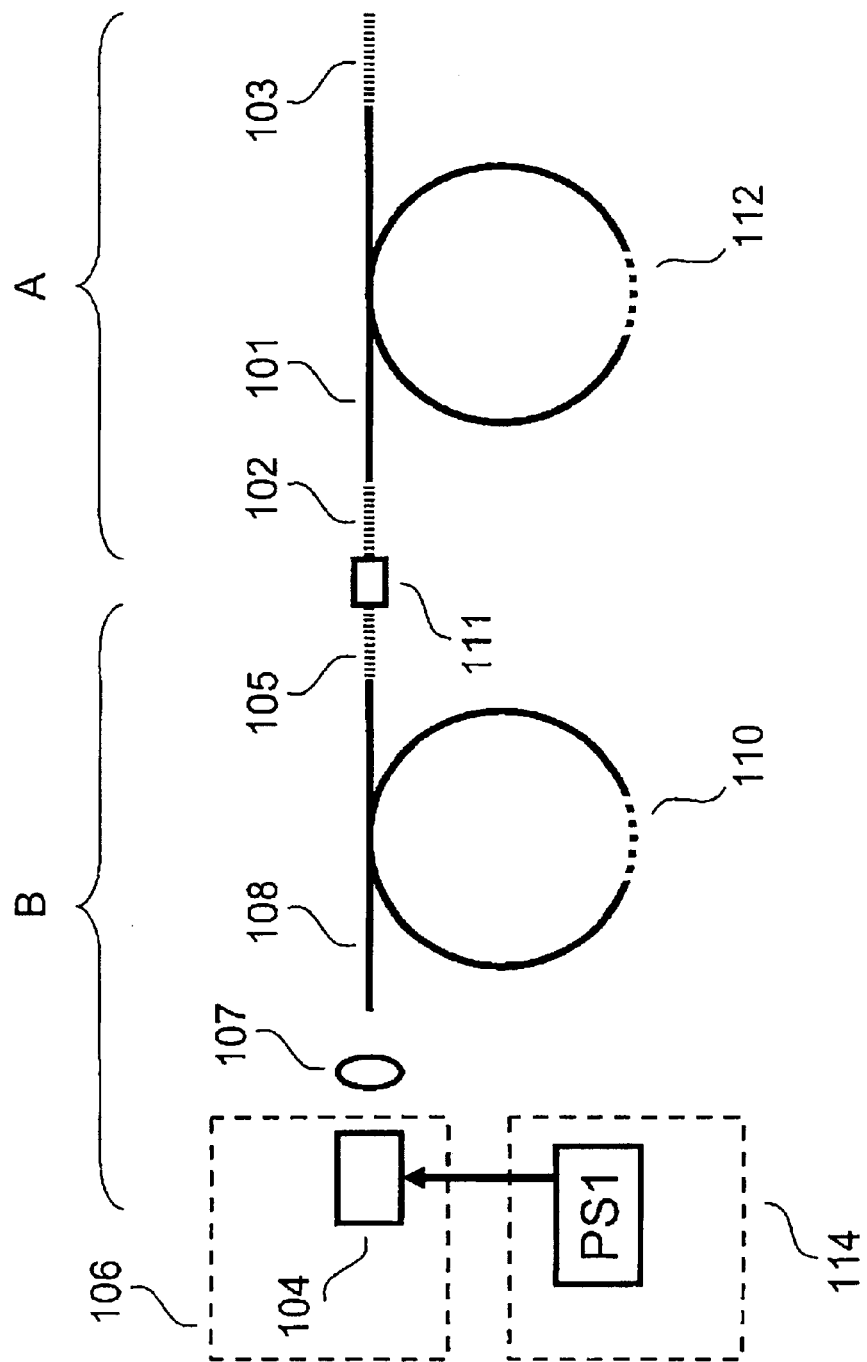
FIG. 1 is an illustration of the preferred embodiment of the invention taught herein.

A preferred embodiment of the invention is illustrated in and is described with reference to FIG. 1 where two cavities are shown. The first is a fiber based resonant cavity, labeled A, that contains an optical processing medium 101 also referred to as an optical processing element, which is non-linear dispersion shifted medium. This resonant cavity is bounded by the two reflective elements 102 and 103. A pump laser cavity, labeled B, which is also a resonant cavity is bounded by the reflective elements 104 and 105. It contains a laser source 106, illustrated in more detail in FIG. 2, an optical focusing element 107 and a fiber element 108. The laser source is driven by a pulsed current source 114, also labeled PS1. The pulsed current source illustrated in more detail in FIG. 5. Pulsed single wavelength radiation (also referred to as pump radiation) is generated in the pump resonant cavity. Single wavelength stabilization is accomplished by having a distributed grating filter 110 in the fiber and reflecting a portion of the filtered wavelength by the reflecting element 105 in a manner synchronized with the pulsed current source. The pulsed radiation output from the pump resonant cavity is coupled into the optical processing resonant cavity by means of a coupling element 111. As this coupled pulsed radiation propagates through the optical processing medium 101, it generates radiation at additional wavelengths by an optical mixing process, such as four wave mixing (for purposes of this application wave mixing or four wave mixing will include all types of wave mixing, including Stokes, Raman, etc.). Radiation corresponding to some of the multiplicity of wavelengths to be generated is reflected by a distributed reflective element 112, such as a Bragg grating. These reflected wavelengths coincides with the pump radiation as it enters the resonant cavity and co-propagate with the pump radiation through the non-linear optical processing medium (also referred to as the non-linear medium). The reflected wavelengths seed the process of four wave mixing and enhance the generation of these wavelengths. The process of four wave mixing causes these wavelengths to generate additional wavelengths. These additional wavelengths, in turn generate further additional wavelengths all separated by the frequency difference between the initial wavelengths. These additional wavelengths extend the bandwidth of the output radiation, because all of the wavelengths are simultaneously available. In this manner the invention generates a broad range or set of wavelengths from the original limited wavelengths. The medium is designed to be highly non linear, which facilitates four wave mixing and it is also designed to have zero dispersion over the wavelength range being generated which allows all wavelengths to propagate through the medium at the same velocity. This process of generating additional wavelengths is enhanced by the resonant nature of the cavity, which allows multiple passes through the optical processing medium in a multiple pass resonant manner). Note, a resonant cavity can only efficiently support wavelengths for which integer multiples of the wave lengths equal the length of the resonant cavities (N×Lambda=c/2 nL, c=speed of light, n=refractive index, L=length of cavity. This process is also enhanced by the synchronous relationship between the repetition rate of the cavities and the frequency separation between the seeding reflected wavelengths, or in the case of a ring cavity, the seeding circulating wavelengths. For purposes of this application reflective or reflection includes circulating or circulation.

Figure 2:
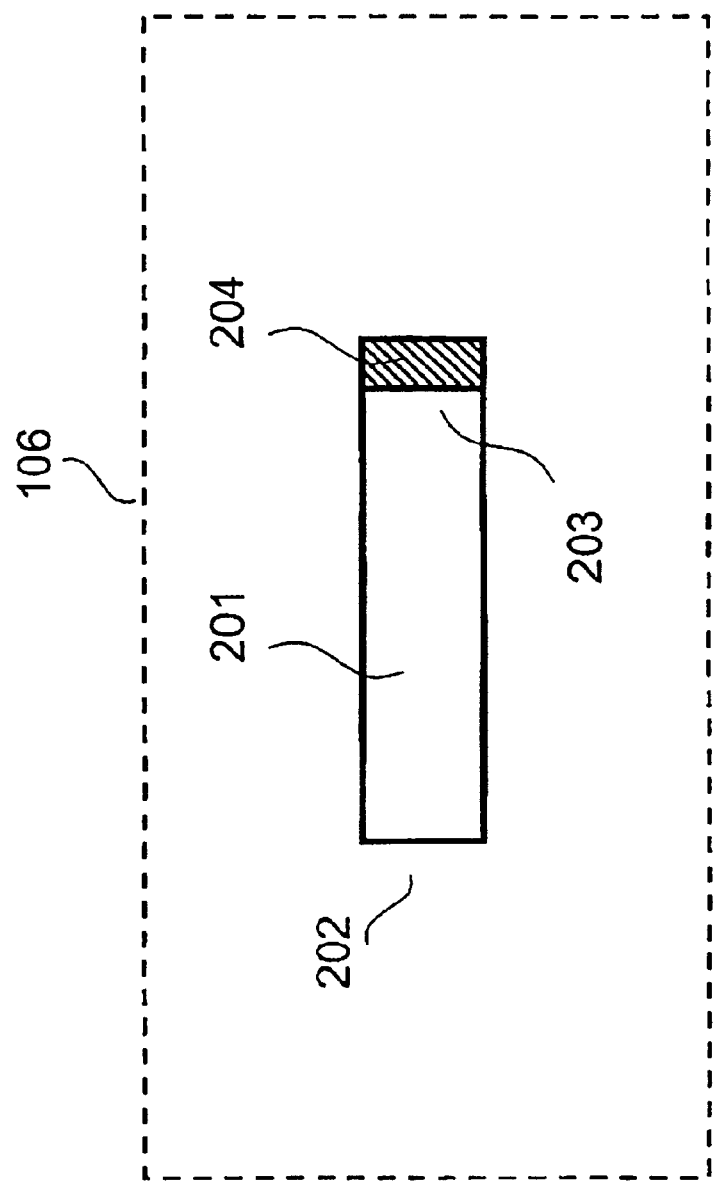
FIG. 2 is a detailed description of a laser source.

The pulsed laser sources, illustrated in FIG. 2, consists of a Fabry Perot laser diode 201, with a rear flat surface 202 which forms one end mirrored surface of the resonant cavity, and has a reflective coating at the wavelength of the laser diode. The front flat surface 203 of the laser diodes is highly transmissive and has a layer of saturable absorber material 204, which is designed to shorten the temporal duration of the optical pulse. For the purpose of this application these surfaces are also referred to as facets. The optical radiation is focused into the fiber 108 using an optical focusing element 107, such as an aspheric lens or a more complex conventional system consisting of a collimating lens, an anarmorphic pair and a focusing lens. The other end 105 of the pump resonant cavity is slightly reflective at the pump wavelength. The fiber 108 has a distributed imprinted diffractive gratings which filters the radiation from the pump laser. The laser source is pulsed with a repetition rate that is synchronous with the round trip time of the resonant cavity. The resonant aspect of the cavity induces the laser source to radiate only at the wavelength determined by the diffraction grating 110. Alternatively the end reflective element 105 of the pump resonant cavity can be a reflective grating which only reflects the desired pump wavelength and thus stabilizes the wavelength of the pump laser.

The laser source 106 is pulsed because high peak power enhances the transformation of source or pump radiation into the generated multiple wavelength set by four wave mixing. Several methods of pulsing can be used, including mode locking and gain switching. In mode locking all the possible modes at which the cavity can lase are phase locked to form a short optical pulse with a repetition rate determined by the round trip time of the cavity. The preferred laser source in this embodiment is a gain switched laser diode. Gain switching a laser diode may be accomplished by using a direct current to bias the laser diode close to the lasing threshold and also applying a short repetitive burst of current from an ac coupled pulsed current source. The laser diode is driven above the lasing threshold and emits a short burst of radiation. This process of maintaining the laser diode close to threshold and pulsing it above threshold is referred to as gain switching. The short current pulse may be generated, for example, by a circuit containing a step recovery diode powered by an RF signal. This approach is a method of generating a high peak power optical pulse without the use of an expensive optical amplifier. The resulting pulse of radiation may be further shortened by enhancing the saturable absorption of the laser diode. A saturable absorber is a passive technique for reducing the temporal duration of an optical pulse. The optical pulse may be further reduced by other conventional techniques such as diffraction grating pairs, fiber gratings or non linear fiber loop mirrors.

Figure 3:
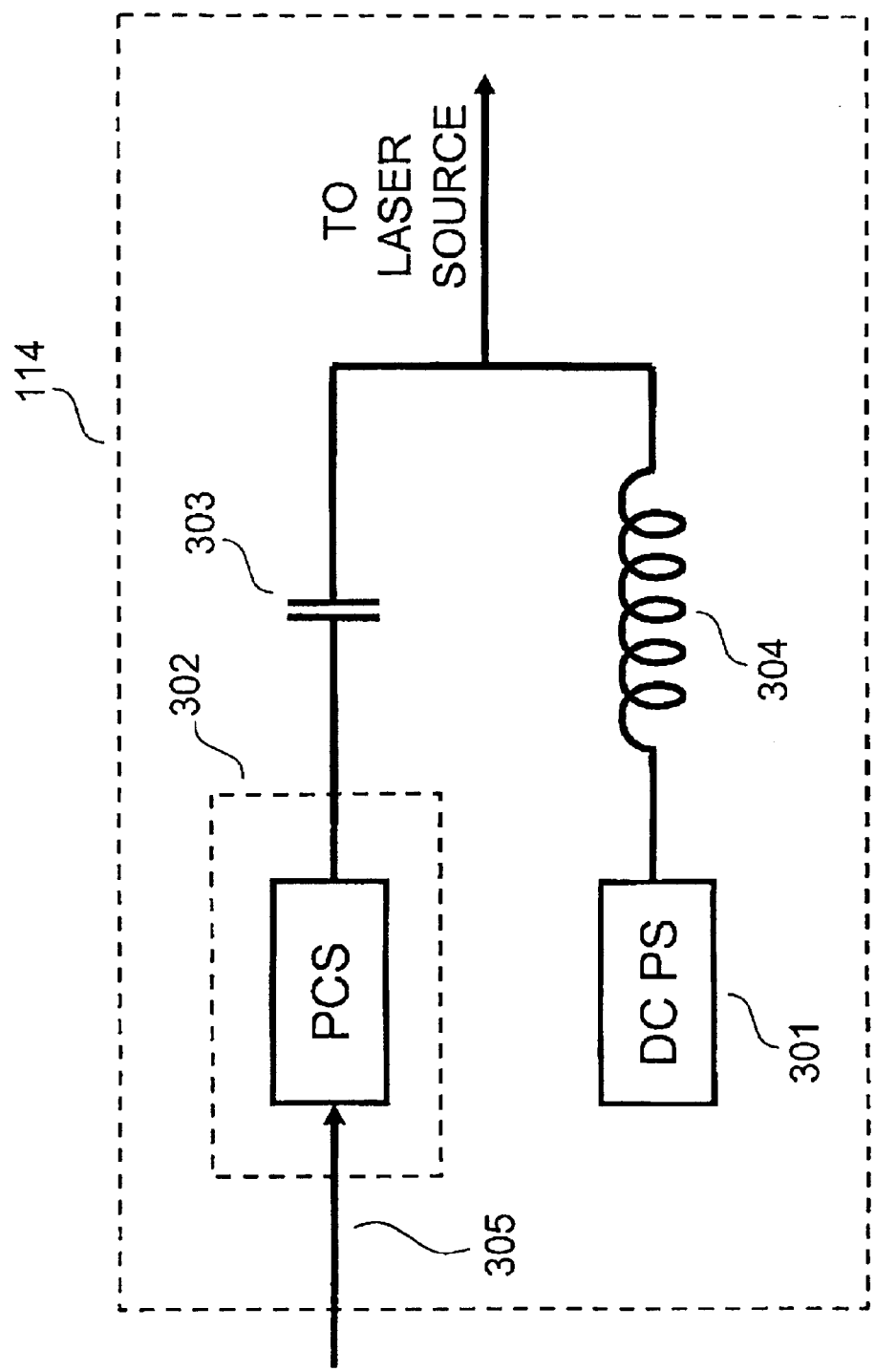
FIG. 3 is an illustration of a laser diode power source.
Figure 4:
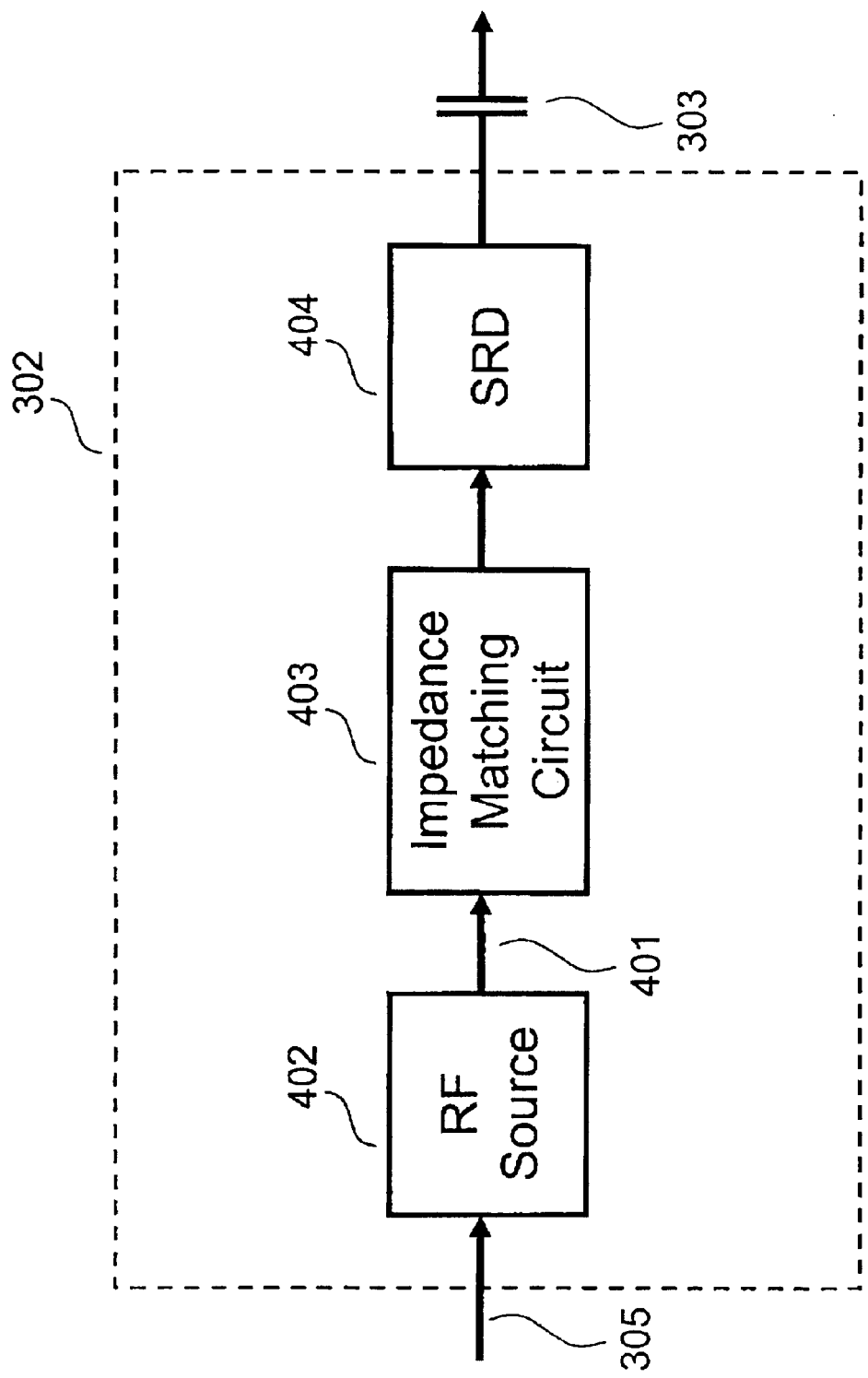
FIG. 4 is an illustration of a pulsed current source.
Figure 5:
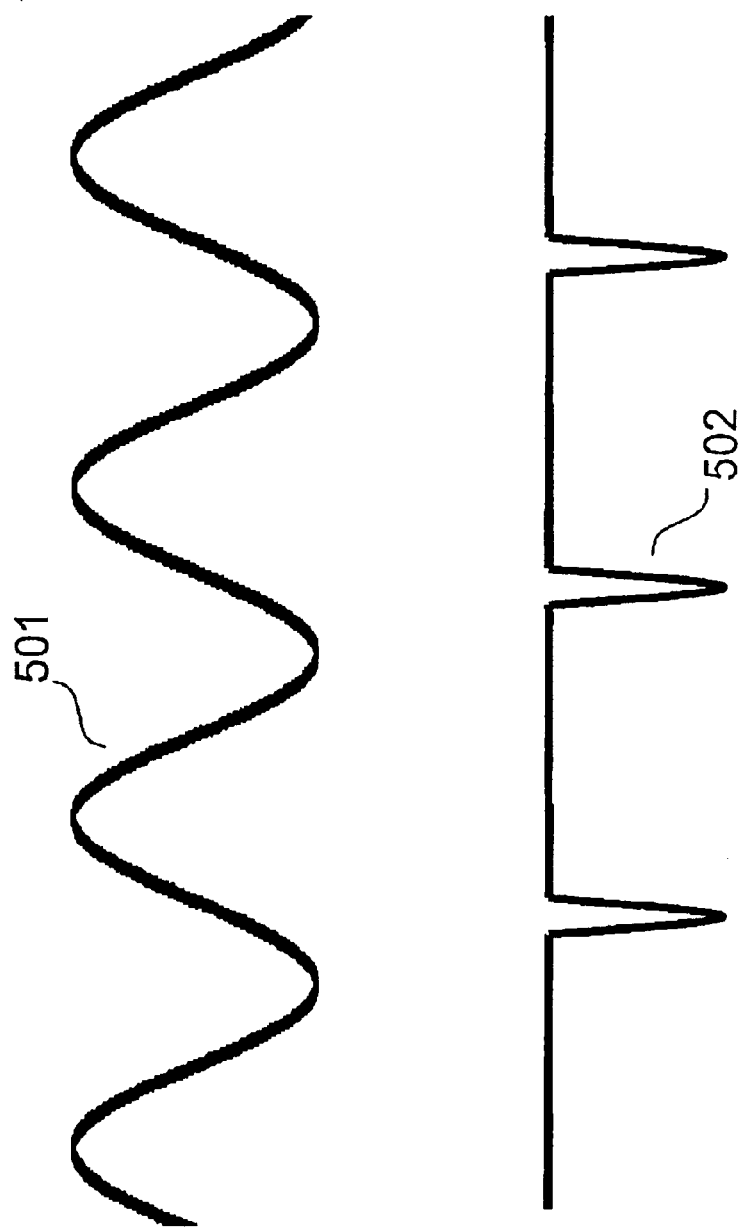
FIG. 5 is an illustration of an RF signal and current pulses.

The preferred laser source is powered by an electrical power source 114, that is illustrated in more detail in FIG. 3. The power source consists of two elements. The first 301, called DC PS, is a DC power source which biases the laser diode just below threshold. The second element 302, called PCS, is a pulsed current source that is AC coupled to the laser diode through a capacitive element 303. An inductive element 304 prevents the AC current flowing to the DC power source. The pulsed current source is controlled by a reference signal 305. This arrangement causes the laser diode to operate in a gain switched mode wherein the laser diode emits an optical pulse in response to the current pulse. The short current pulse can be generated by such means as illustrated in FIG. 4 where an RF signal 401, from an RF source 402 is impedance matched by matching circuitry 403 to a step recovery diode 404, called SRD. The step recovery diode accumulates the RF power during one phase and this energy is swept from the diode in the form of a short current pulse during the second phase of the RF cycle. FIG. 5 describes a typical relationship between the RF signal 501 and the current pulse 502 from the step recovery diode. The laser diode typically has an inherent saturable absorption effect which compresses the optical pulse in the time domain. The pulse is farther compressed be the addition of a saturable absorber layer 204 in FIG. 2.

The value of the wavelengths that are reflected by the distributed reflective element 112 are selected to correspond to wavelengths on a standard grid, such as the ITU optical communications grid the frequency difference between these wavelengths is the harmonically related to the frequency separation between all of the wavelengths on the standard grid.

Figure 6:
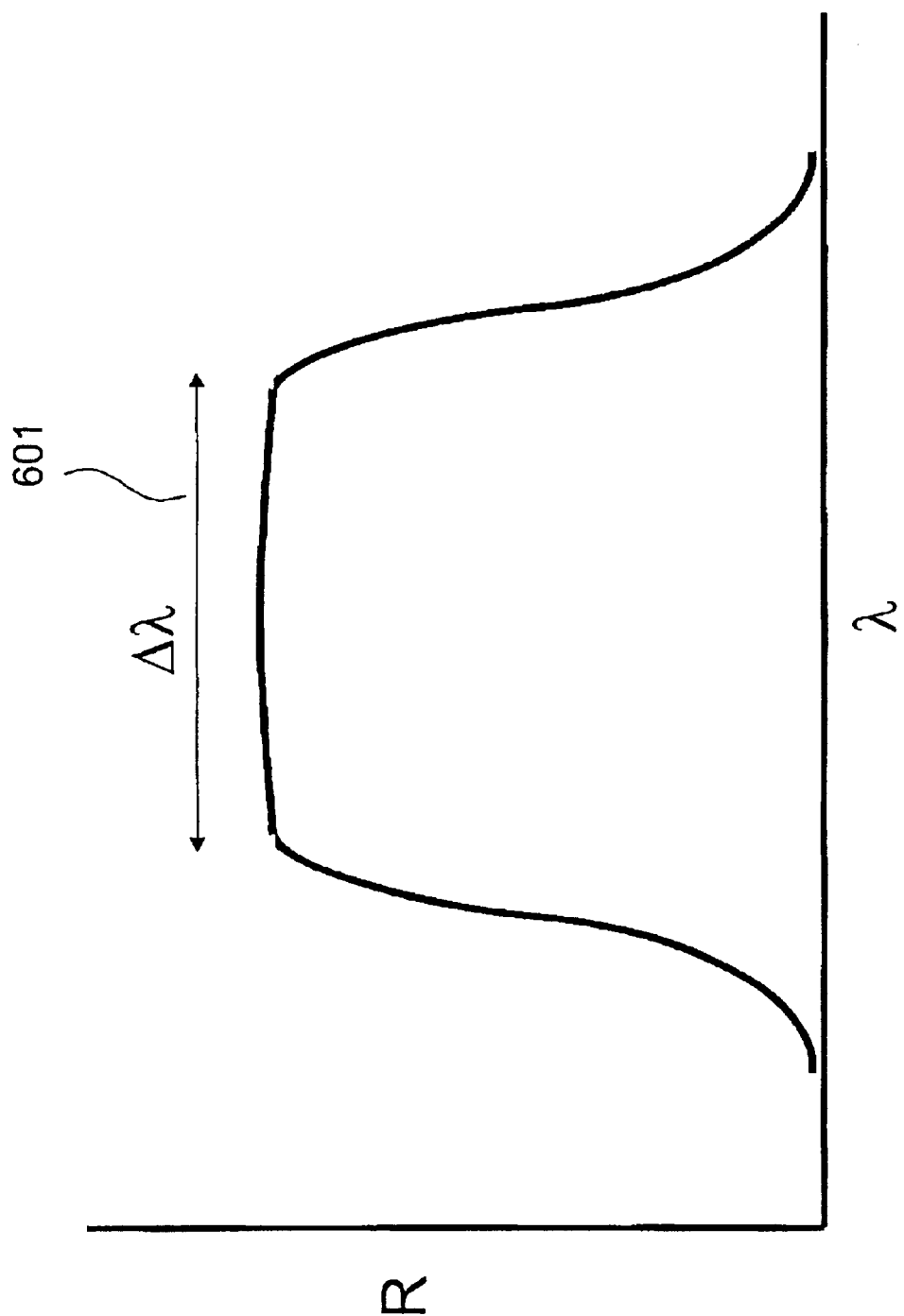
FIG. 6 is an illustration of a typical reflectivity profile of an end mirror of a laser source.
Figure 7:
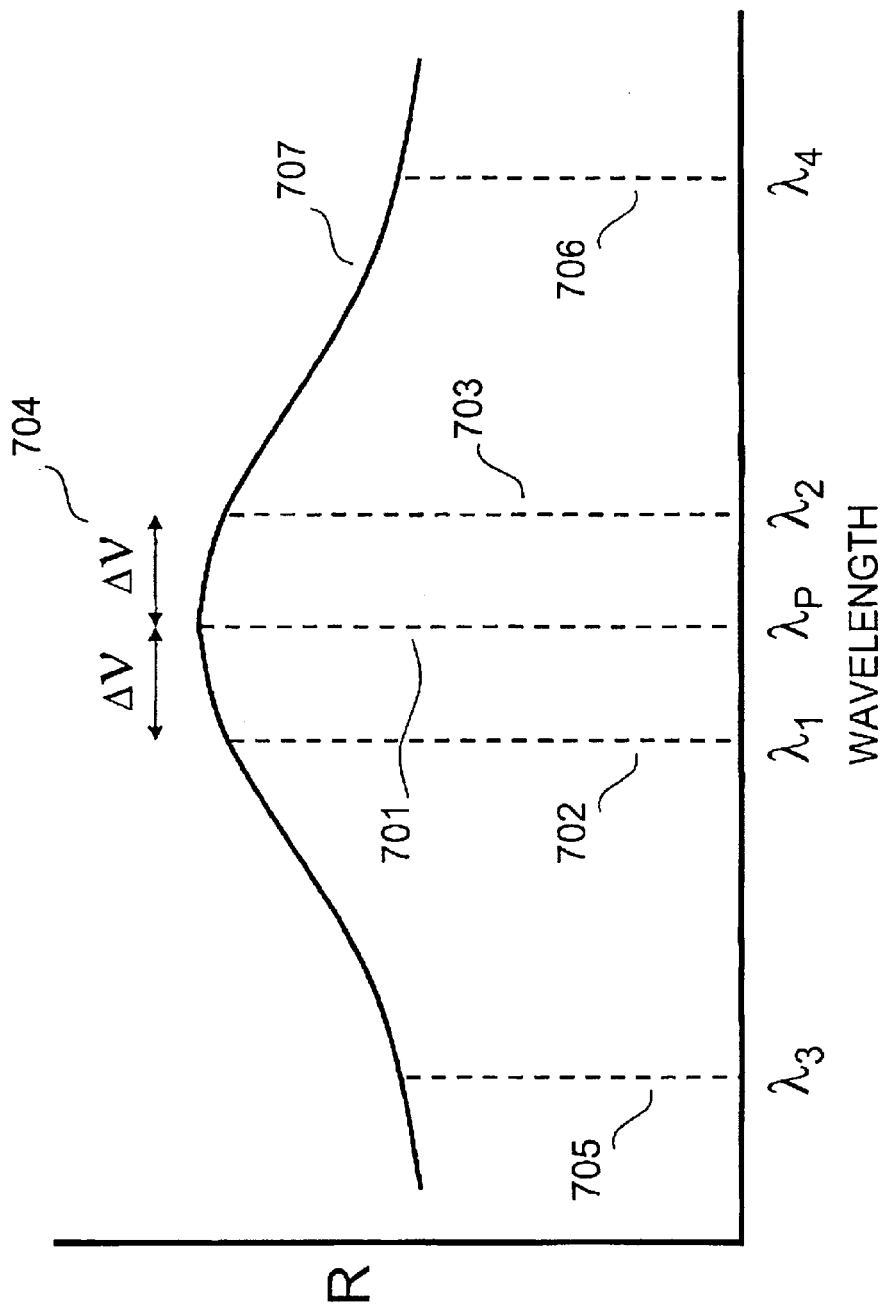
FIG. 7 is an illustration of a typical reflectivity profile of the output coupler.

Dispersion of a medium refers to the variation of the speed of propagation of radiation with wavelength within the medium. Typically the optical dispersion of a medium exhibits one or more minima at specific wavelengths around which the variation of speed of propagation with wavelength is small. Dispersion shifted media is designed to have zero dispersion close to the desired operating wavelength. This allows all of the generated wavelengths to propagate at the same velocity within the resonant cavity. The optical processing resonant cavity A has one highly reflective end element 102, that has a reflective profile illustrated in FIG. 6 and a second reflective end element 103, acting as the output coupler with a reflective profile similar to that illustrated in FIG. 7. In FIG. 6 the reflectivity is high for wavelengths within the desired wavelength range 601, labeled $\Delta\lambda$. In FIG. 7 the reflectivity is high at the pump wavelength $\lambda_P$ 701, lower at partially reflected seed wavelengths 702 labeled $\lambda_1$ and 703 labeled $\lambda_2$. The partially reflected seed wavelengths $\lambda_1$ and $\lambda_2$ which are each different from the pump wavelength $\lambda_P$ by the frequency separation 704 called $\Delta v$. The reflectivity decreases as the wavelength increases in distance from the center wavelengths $\lambda_1$ and $\lambda_2$. Note, other combinations of seed wavelengths could be used, for example, wavelengths, such as $\lambda_3$ 705 and $\lambda_4$ 706 could also be seeded by having partially reflecting gratings, or all desired wavelengths could be seeded, or only one wavelength $\lambda_1$ could be seeded. In these cases the reflection profile 707 would be adjusted appropriately. This arrangement causes the pump wavelengths and the generated set of wavelengths to remain substantially within the resonant cavity A, while wavelengths outside the desired range are discarded through the reflective element 102 and causes the output coupler 103 to emit the set of generated wavelengths with output intensities that are substantially the same or are equalized by the varying reflectivity profile 707.

The non linear characteristics of the dispersion shifted medium cause an interaction between the short optical pulse and the medium which transforms the pump radiation to a continuum of wavelengths. This non linear aspect is enhanced in medium referred to as photonic fiber or photonic crystal or photonic crystal fiber. By locating such dispersion shifted medium within a resonant cavity, the optical pump pulses circulate within the cavity and effectively extend the interaction length of the optical pulse and the dispersion shifted medium this multi pass circulation would occur in a fiber ring or micro-ring wave guide cavity, or a linear cavity, all of which can be described as operating in a multiple pass resonant manner. The resonant cavity can also be designed such that the optical length of the cavity (and hence its round trip time) corresponds to a frequency which is harmonically related to the frequency separation of the desired wavelength set. The optical pump diode is pulsed with a repetition rate that is synchronous with the round trip time of the pump cavity and also is harmonically related to the round trip time of the non-linear resonant cavity. This causes the wavelengths generated by the dispersion shifted medium to be a set of discrete wavelengths separated by a frequency of the repetition rate, rather than a continuum of wavelengths. The synchronous nature of the resonant cavity enhances the designed characteristics of the dispersion shifted medium.

Figure 8:
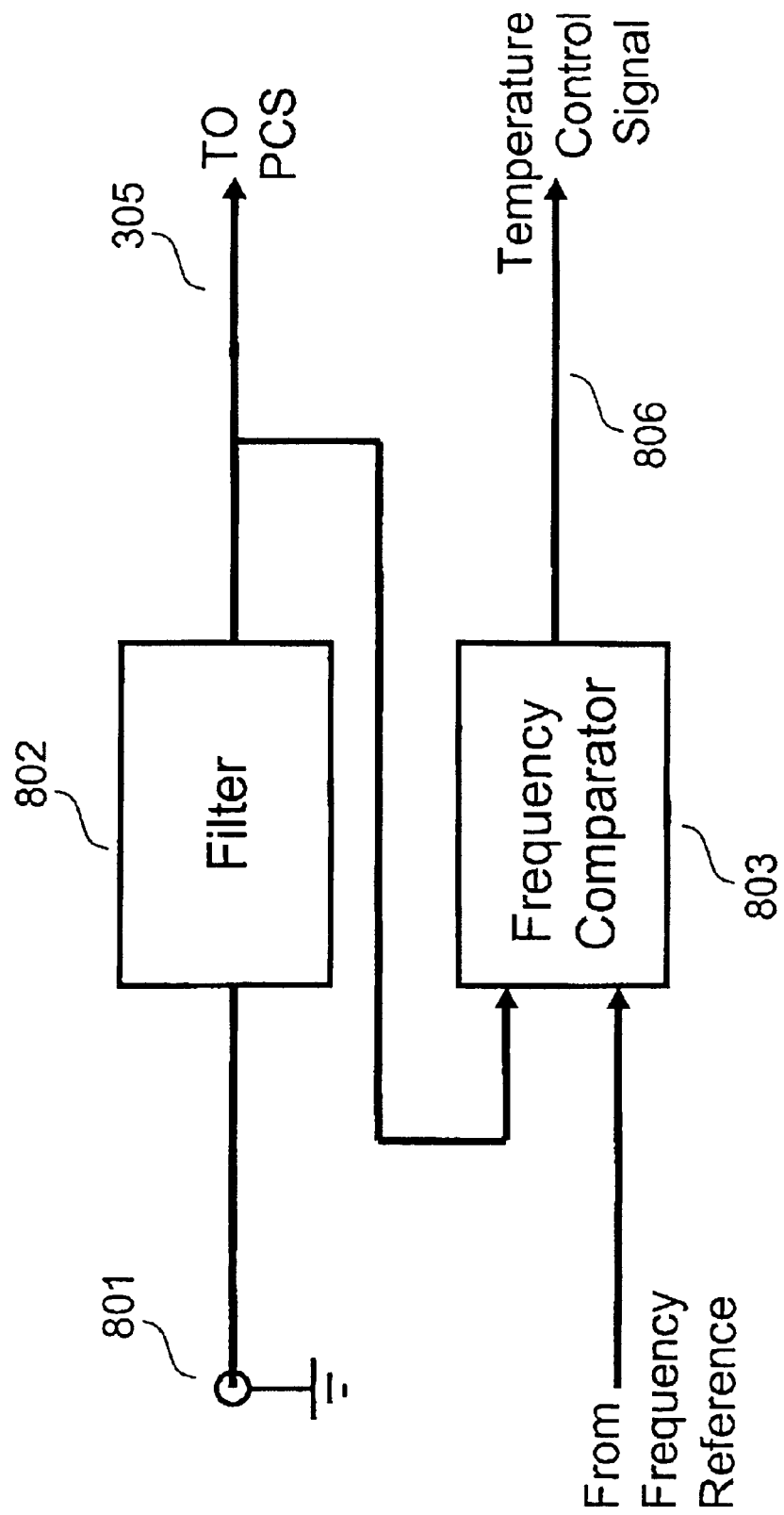
FIG. 8 is an illustration of a feedback system.

The length of the resonant cavity is actively controlled by a feedback system illustrated in FIG. 8. The optical pulse sequence is detected by a detector 801 and its output signal is filtered by a filter 802, such as a phase lock loop. The output of this filter is the signal 305, which is used as the reference signal of the pulsed current source PCS. The signal 305 is also applied to a frequency comparison system 803, where it is compared with a frequency reference signal to produce an error signal 806 that is used to control the optical length by such means as of temperature control. In this manner, the resonant cavity length and the repetition rate of the current pulses are stabilized to the same frequency reference. Using distributed reflective gratings as the reflective elements of the pump cavities allows the pump cavities to lock to the current pulses automatically.

Figure 9:
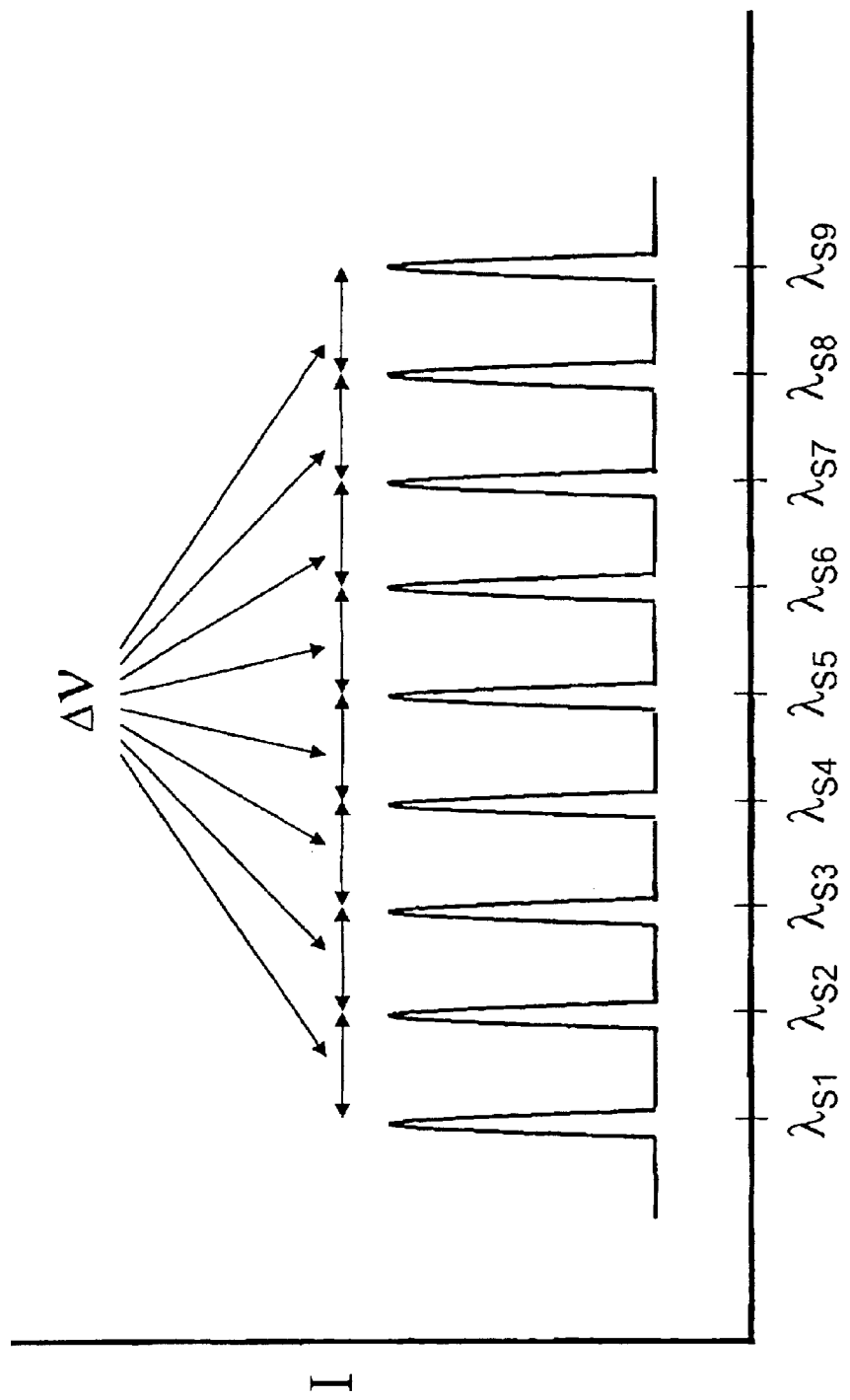
FIG. 9 is an illustration of a set of wavelengths, such as the ITU grid.

The combination of partially reflecting seed wavelengths that are specific wavelengths separated by an amount related to the desired frequency separation of the set of wavelengths to be generated (related to the frequency reference), synchronizing the repetition rate of the current pulse with the round trip time of the resonant cavity and locking to the frequency reference, enhances generation of the complete set of desired wavelengths, referred to as the generated set of wavelengths, or set of wavelengths generated, because all of the wavelengths in the set are simultaneously available. The frequency reference is chosen to be related to the desired frequency separation of the wavelength set. In this manner the frequency separation of the wavelength set can be contrived to be the frequency separation of a standard grid such as an ITU optical communications grid. The absolute values of the generated set of wavelengths are determined by the values of the partially reflected seed wavelengths and by the design of the dispersion shifted medium. An ideal set of generated wavelengths is illustrated in FIG. 9, where 9 wavelengths $\lambda_{S1}$ to $\lambda_{S9}$ all have the same intensity, I and all are separated by the same frequency difference $\Delta v$ which is harmonically related to the frequency reference. Typically $\lambda_{S4}$ and $\lambda_{S6}$ of FIG. 9 would correspond to $\lambda_1$ and $\lambda_2$ of FIG. 7. The transmission characteristics of the two end mirrors (or reflective elements) of the resonant cavity are designed to equalize the output powers of the set of generated wavelengths.

Figure 10:
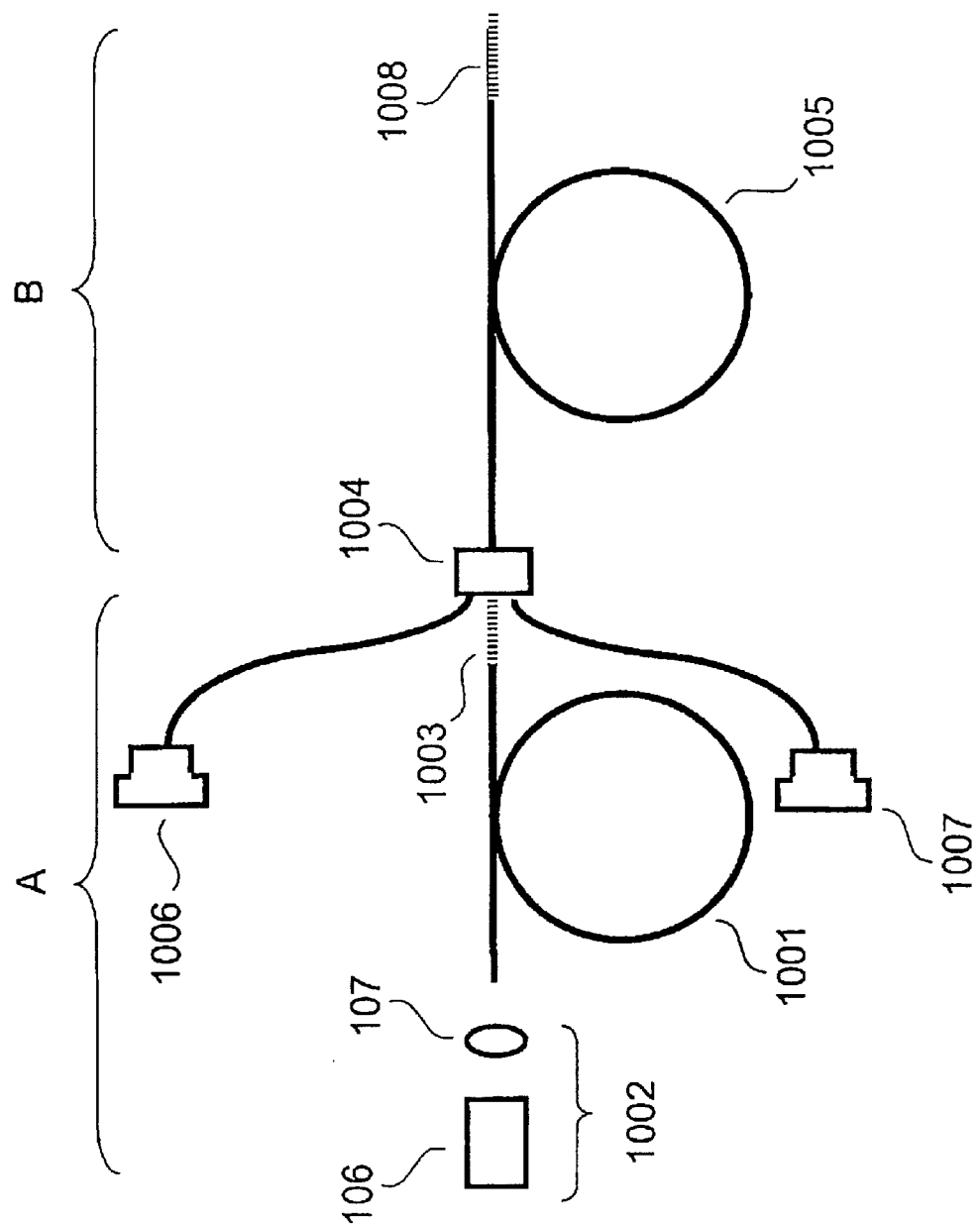
FIG. 10 is an illustration of a fiber based system seeded by two laser diodes.
Figure 11:
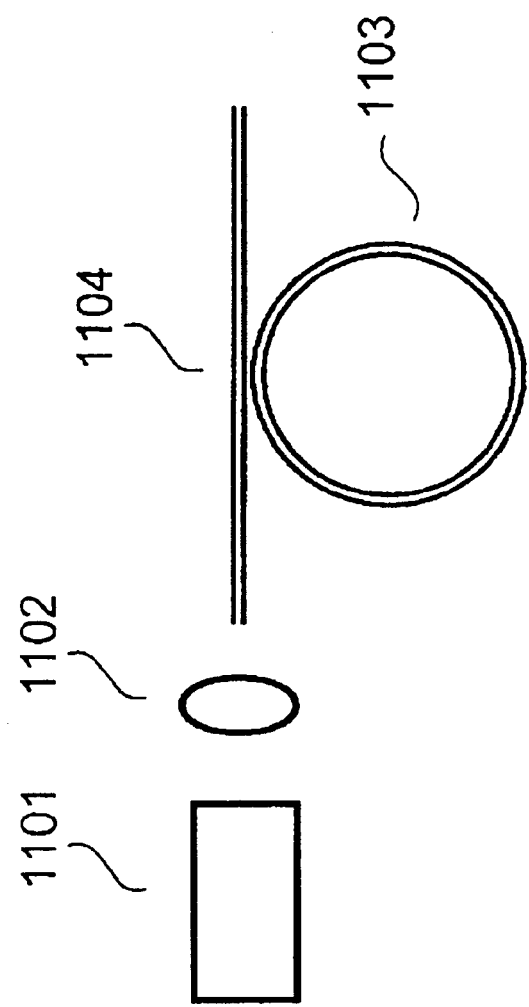
FIG. 11 is an illustration of a ring resonant cavity pumped by a pulsed laser source.
Figure 12:
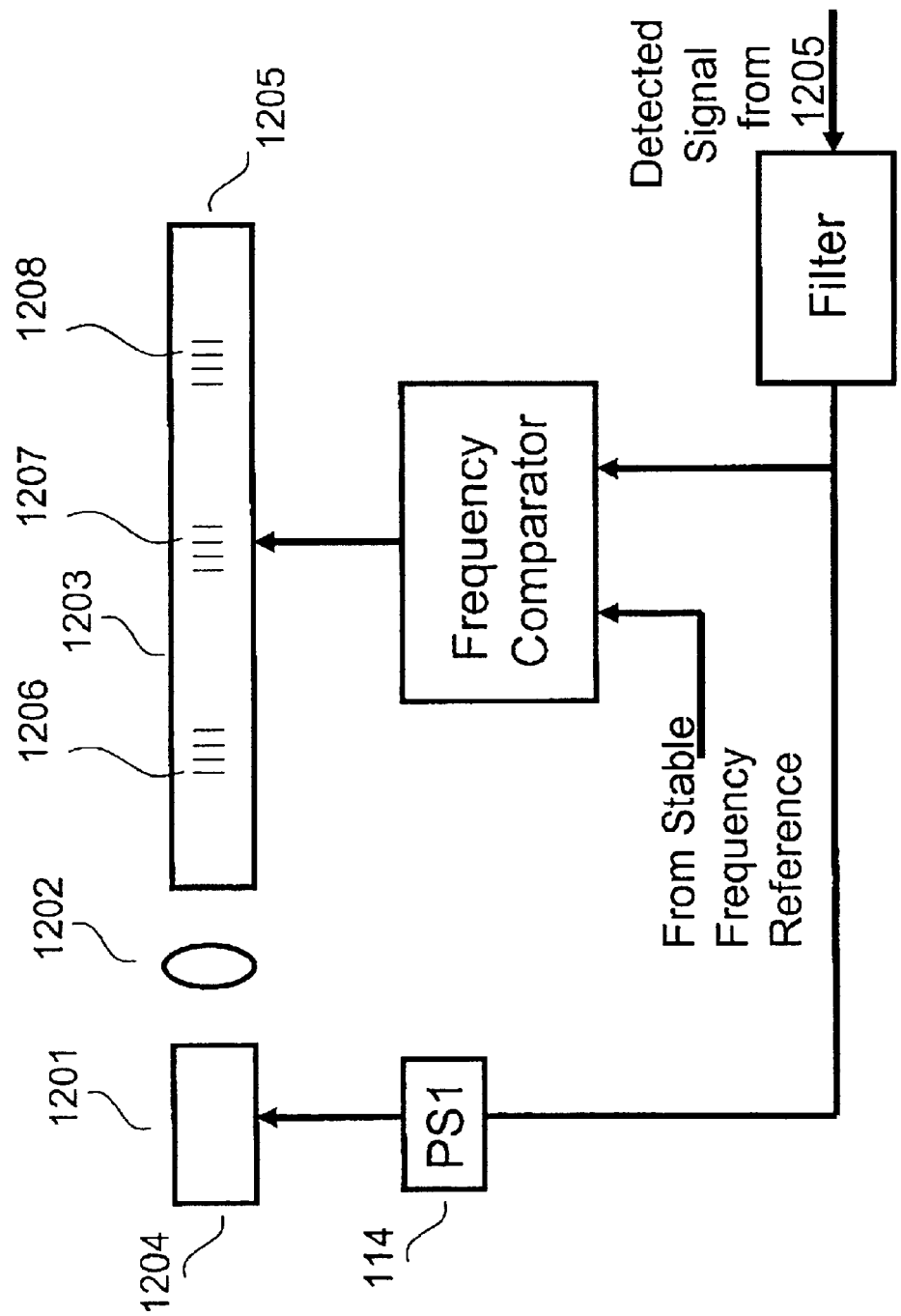
FIG. 12 is an illustration of a wave guide based system with a pulsed laser source.

Alternative preferred embodiments are illustrated in FIGS. 10, 11 and 12.

In FIG. 10, a single fiber based pump cavity A which includes a pulsed laser source and focusing element 1002 (similar to the source and focusing element 106 and 107 respectively, which are discussed in the preferred embodiment) and fiber 1001 with an end reflective grating 1003, to stabilize the wavelength of the laser source. The output of this cavity is coupled by a coupler 1004 into a second fiber based resonant cavity 1005 also labeled B. Radiation from two additional low power laser diodes 1006 and 1007, which are at two different wavelengths are also coupled into the second fiber based cavity 1005. This cavity contains the highly non-linear dispersion shifted fiber which transform the pump wavelength into the desired set of wavelengths by means of the low power lasers seeding wave mixing generation of these wavelengths, which in turn generate additional wavelengths by wave mixing, and so on. The cavity 1005 may also have distributed gratings designed to enhance the selection of at least some of the desired wavelengths. The mechanism for this is to preferentially reflect in a resonant manner these selected wavelengths This seeding of the wave mixing process will build up these wavelengths, which in turn will build up the adjacent wavelengths of the desired wavelength set. In this manner the desired wavelength set will be generated from a single pump laser source and the additional seeding lasers 1006 and 1007. The output coupler 1008 of this cavity is a reflective element, either grating or coating that has a profile similar to that illustrated in FIG. 7. Other aspects of this embodiment, such as a feedback system to stabilize the system to a frequency reference, are similar to aspects described in the preferred embodiment.

In FIG. 11, a wavelength stabilized pulsed laser source 1101 is focused, by means of a focusing element 1102 into a ring based resonant cavity comprised of optical processing 1103 by means an optical coupler 1104. The wavelength stabilized pulsed laser source 1101 may be similar to the pulsed laser source 106 described in the preferred embodiment, but wavelength stabilized by means of being seeded by a wavelength stabilized low power laser diode or may be stabilized by means of being a distributed feedback laser. Alternatively the wavelength stabilized pulsed laser source 1101 may be a mode locked laser source with a pulse repetition rate harmonically related to the repetition rate of the generated pulses in the resonant cavity 1103. Other aspects of this embodiment, such as a feedback system to stabilize the system to a frequency reference, are similar to aspects described in the preferred embodiment.

In FIG. 12, a system is illustrated that is similar to that illustrated in FIG. 11, except that the resonant cavity is linear wave guide based, rather than ring based. This contains a pulsed laser source 1201, which would constitute the pump cavity and is bounded by the reflective elements 1204 and the opposite end of the pump cavity, and focusing element 1202 and a highly non-linear dispersion shifted waveguide based element 1203. Other aspects of this embodiment, such as multiple Bragg grating elements indicated by 1206, 1207, 1208, which constitute diffraction based seeding elements which diffract specific wavelengths can be other reflective elements and operate by reflecting or transmitting specific wavelengths and end reflective elements are similar in principle to the preferred embodiment. FIG. 12 also illustrates an embodiment in which the pulsed laser radiation from the pump cavity are coupled by means of being co-located. Both cavities, the pump cavity and the optical processing resonant cavity are contained within the end reflective elements 1204 and 1205. The system can be stabilized by a feedback system that consists of detecting a portion of the output from 1205 (the signal), filtering this signal to derive the drive signal for 114. The filtered signal is also compared with a stable reference, such as a stable frequency reference signal to form an error signal which can be used, for example, to control temperature as a means of completing the feedback system It is understood that the above description is intended to be illustrative and not restrictive. Many of the features have functional equivalents that are intended to be included in the invention as being taught. For example, the saturable absorber element could be fully integrated with the laser diode, or other pulse compression techniques, such as non-linear fiber loop or diffraction grating pairs could be used to reduce the duration of the pulse. The laser diode could, for example, be a distributed feedback laser. At least one of the mirrored elements of the resonant cavity could be etched facets, distributed feedback reflectors or distributed Bragg reflectors with deep etched grooves. Various combinations of waveguide elements and fiber based elements can be employed. Other examples will be apparent to persons skilled in the art.

The scope of this invention should therefore not be determined with reference to the above description, but instead should be determined with reference to the appended claims, along with the full scope of equivalents to which such claims are entitled.

What is claimed is:

1. A method of generating repetitive pulsed radiation with a multiplicity of additional discrete wavelengths, the method comprising:

positioning an optical processing medium in a resonant cavity with reflective elements; and generating repetitive pulsed radiation from a pulsed laser source in a pump cavity with reflective elements; and coupling the resonant and pump cavities; and seeding the optical processing medium with at least some of the discrete wavelengths, such that pulsed radiation with a multiplicity of additional discrete wavelengths is generated.

2. The method of claim 1, wherein the optical processing medium has zero dispersion centered on the desired multiplicity of wavelengths.

3. The method of claim 1, wherein the optical processing medium is highly non-linear medium.

4. The method of claim 1, wherein the optical processing medium is dispersion shifted medium.

5. The method of claim 1, wherein the optical processing medium is dispersion shifted fiber.

6. The method of claim 1, wherein the optical processing medium is photonic crystal.

7. The method of claim 1, wherein the optical processing medium is photonic crystal fiber.

8. The method of claim 1, wherein the optical processing medium has reflective elements at both ends to comprise the resonant cavity.

9. The method of claim 1, wherein the optical processing medium has other reflective elements which reflect a portion of at least some of the multiplicity of discrete wavelengths.

10. The method of claim 9, wherein the wavelength values that these reflective elements reflect correspond to at least some wavelengths on a standard grid.

11. The method of claim 10, wherein the standard grid is an optical communications ITU grid.

12. The method of claim 1, wherein the repetition rate of the pulsed laser source is harmonically related to the desired frequency separation of the set of wavelengths to be generated.

13. The method of claim 1, wherein the pump cavity is a resonant cavity with a round trip time harmonically related to the repetition rate of the optical pulses from the pulsed laser source.

14. The method of claim 1, wherein the signal determining the repetition rate of the pulsed laser source is derived from the optical pulse output from at least one of the cavities.

15. The method of claim 1, wherein the repetition rate of the pulsed laser source is maintained at fixed value by means of feedback circuitry, a control mechanism and a stable reference.

16. The method of claim 15, wherein the control mechanism is temperature control.

17. The method of claim 1, wherein the pulsed laser source is a pulsed laser diode.

18. The method of claim 1, wherein the pulsed laser source is a gain switched laser diode.

19. The method of claim 18, wherein the gain switched laser diode receives a current pulse from circuitry containing a step recovery diode and an RF source.

20. The method of claim 1, wherein the pulsed laser source is a mode locked laser source.

21. The method of claim 1, wherein the peak power of the pulsed output of the pulsed laser source is increased by compressing the temporal duration of the pulses.

22. The method of claim 21, wherein the temporal compression of the pulses is achieved by means of saturable absorption.

23. The method of claim 21, wherein the temporal compression of the pulses is achieved by means of diffraction gratings.

24. The method of claim 21, wherein the temporal compression is achieved by means of distributed fiber diffraction grating.

25. The method of claim 21, wherein the temporal compression is achieved by means of at least one non linear fiber loop.

26. The method of claim 1, wherein the pulsed laser source is stabilized to emit radiation at a specific wavelength.

27. The method of claim 26, wherein the pulsed laser source is wavelength stabilized by means of seeding by a wavelength stabilized laser.

28. The method of claim 13, wherein the pulsed laser source in a resonant pump cavity is wavelength stabilized by means of a reflective Bragg grating in the resonant cavity.

29. The method of claim 1, wherein the pump cavity is coupled to the resonant cavity by means of fiber coupling.

30. The method of claim 1, wherein the pump cavity is coupled to the resonant cavity by means of waveguide elements.

31. The method of claim 1, wherein the resonant cavity and the pump cavity are coupled interferometrically to transfer substantially all the pump radiation to the resonant cavity and to prevent radiation at the pump wavelength from emerging from the resonant cavity at the coupler.

32. The method of claim 1, wherein the resonant cavity and the pump cavities are coupled by being co-located as a single resonant cavity, which is comprised of the laser source, the optical processing medium and reflective elements.

33. The method of claim 1, wherein at least one reflective element is a facet of a laser source.

34. The method of claim 1, wherein at least one reflective element is an end of the optical processing medium.

35. The method of claim 1, wherein the reflective elements are distributed Bragg gratings.

36. The method of claim 1, wherein one reflective element is designed so that it is highly reflective at the wavelengths of the generated set and at the wavelength of the laser source.

37. The method of claim 1, wherein at least one of the reflective elements transmits an equal amount of each wavelength in the generated set of wavelengths.

38. The method of claim 1, in which the pump radiation coupled into the resonant cavity generates other wavelengths by means of wave mixing in the non-linear medium.

39. The method of claim 1, wherein at least some of the reflective elements of the resonant cavity reflect a portion of at least some of the multiplicity of discrete wavelengths in a manner that is synchronous with the pump to seed the generation of these reflected wavelengths.

40. The method of claim 1, wherein two low power continuous wave laser diode sources are also coupled into the resonant cavity to seed generation of higher power pulsed radiation at the wavelengths of the two low power laser diodes, said higher powered pulsed radiation being powered by the pump radiation.

41. The method of claim 1, wherein the seed wavelengths generate additional wavelengths of the multiplicity of discrete wavelengths.

42. The method of claim 1, wherein the multiplicity of wavelengths generated correspond to wavelengths on a standard grid.

43. The method of claim 42 wherein the standard grid is an optical communications ITU grid.

44. The method of claim 1, wherein the cavities include waveguide elements.

45. The method of claim 1, wherein at least the resonant cavity is a waveguide resonant cavity.

46. The method of claim 1, wherein the resonant cavity has a fiber coupled output.

47. An apparatus for generating repetitive pulsed radiation with a multiplicity of additional discrete wavelengths, the apparatus consisting of:
an optical processing element with reflective elements, said optical processing element operable in a multiple pass resonant manner; and
seeding elements operable in the optically processing element to initiate generation of at least some of the discrete wavelengths; and
an optically active element with reflective elements operable to generate repetitive pulsed pump radiation, said optically active element optically coupled to the optical processing element, and
operable to transmit such repetitive pulsed pump radiation to the optical processing element, such that repetitive pulsed radiation with a multiplicity of additional discrete wavelengths is generated.

48. The apparatus of claim 47, wherein the optical processing medium has zero dispersion centered on the desired multiplicity of wavelengths.

49. The apparatus of claim 47, wherein the optical processing medium is highly nonlinear medium.

50. The apparatus of claim 47, wherein the optical processing medium is dispersion shifted medium.

51. The apparatus of claim 47, wherein the optical processing medium is dispersion shifted fiber.

52. The apparatus of claim 47, wherein the optical processing medium is photonic crystal.

53. The apparatus of claim 47, wherein the optical processing medium is photonic crystal fiber.

54. The apparatus of claim 47, wherein the optical processing medium has reflective elements at both ends enabling said optical processing medium to operate in a multiple pass resonant manner.

55. The apparatus of claim 47, wherein the optical processing medium has other reflective elements operable to reflect a portion of at least some of the multiplicity of discrete wavelengths.

56. The apparatus of claim 55, wherein the wavelength values that these reflective elements reflect correspond to at least some wavelengths on a standard grid.

57. The apparatus of claim 56, wherein the standard grid is an optical communications ITU grid.

58. The apparatus of claim 47, wherein the repetition rate of the repetitive pulsed pump radiation is harmonically related to the desired frequency separation of the set of wavelengths to be generated.

59. The apparatus of claim 47, wherein the optically active element is operable in a resonant manner with a round trip time harmonically related to the repetition rate of the repetitive pulsed pump radiation from the optically active element.

60. The apparatus of claim 47, wherein the signal determining the repetition rate of the optically active element is derived from the at least some of the repetitive pulsed radiation.

61. The apparatus of claim 47, wherein the repetition rate of the repetitive pulsed radiation is maintained at fixed value by means of feedback circuitry, a control mechanism and a stable reference.

62. The apparatus of claim 61, wherein the control mechanism is temperature control.

63. The apparatus of claim 47, wherein the optically active element is a pulsed laser diode.

64. The apparatus of claim 47, wherein the optically active element is a gain switched laser diode.

65. The apparatus of claim 64, wherein the gain switched laser diode receives a current pulse from circuitry containing a step recovery diode and an RF source.

66. The apparatus of claim 47, wherein the optically active element is a mode locked laser source.

67. The apparatus of claim 47, wherein the peak power of the pulsed output of the optically active element is increased by compressing the temporal duration of the pulsed radiation.

68. The apparatus of claim 67, wherein the temporal compression of the pulsed radiation is achieved by means of saturable absorption.

69. The apparatus of claim 67, wherein the temporal compression of the pulsed radiation is achieved by means of diffraction gratings.

70. The apparatus of claim 67, wherein the temporal compression of the pulsed radiation is achieved by means of distributed fiber diffraction grating.

71. The apparatus of claim 67, wherein the temporal compression of the pulsed radiation is achieved by means of at least one non linear fiber loop.

72. The apparatus of claim 47, wherein the optically active element is stabilized to emit radiation at a specific wavelength.

73. The apparatus of claim 72, wherein the optically active element is wavelength stabilized by means of seeding by a wavelength stabilized laser.

74. The apparatus of claim 72, wherein the optically active element is wavelength stabilized by means of a reflective Bragg grating.

75. The apparatus of claim 47, wherein the optically active element is coupled to the optical processing element by means of fiber coupling.

76. The apparatus of claim 47, wherein the optically active element is coupled to the optical processing element by means of waveguide elements.

77. The apparatus of claim 47, wherein the optically active element and the optical processing element are coupled interferometrically operable to transfer substantially all the repetitive pulsed pump radiation to the optical processing element and operable to prevent said radiation from emerging from the optical processing element at the coupler.

78. The apparatus of claim 47, wherein the optical processing element and the optically active element are coupled by means of both being positioned between reflective elements, said reflective elements operable to confine predetermined amounts of the repetitive pulsed pump radiation and the repetitive generated pulsed radiation.

79. The apparatus of claim 47, wherein at least one reflective element is a facet of a laser source.

80. The apparatus of claim 47, wherein at least one reflective element is an end of the optical processing medium.

81. The apparatus of claim 47, wherein the reflective elements are distributed Bragg gratings.

82. The apparatus of claim 47, wherein one reflective element is highly reflective at the wavelengths of the generated set and at the wavelength of the laser source.

83. The apparatus of claim 47, wherein at least one of the reflective elements transmits an equal amount of each wavelength in the generated set of wavelengths.

84. The apparatus of claim 47, in which the repetitive pulsed pump radiation coupled into the optical processing medium operable to generate other wavelengths by means of wave mixing in the non-linear medium.

85. The apparatus of claim 47, wherein at least some of the reflective elements reflect a portion of at least some of the multiplicity of discrete wavelengths operable in a manner that is synchronous with the repetitive pulsed pump radiation.

86. The apparatus of claim 47, wherein at least some of the reflective elements reflect a portion of at least some of the multiplicity of discrete wavelengths operable in a manner that seeds the generation of these reflected wavelengths.

87. The apparatus of claim 47, wherein two low power continuous wave laser diode sources are also coupled to the optical processing medium, operable as seeding elements to seed generation of higher power pulsed radiation at the wavelengths of the two low power laser diodes, said higher powered pulsed radiation being powered by the repetitive pulsed pump radiation.

88. The apparatus of claim 47, wherein the multiplicity of wavelengths generated correspond to wavelengths on a standard grid.

89. The apparatus of claim 88, wherein the standard grid is an optical communications ITU grid.

90. The apparatus of claim 47, wherein the optical processing element includes waveguide elements.

91. The apparatus of claim 47, wherein the optically active element includes waveguide elements.

92. The apparatus of claim 47, wherein the optical processing element has a fiber coupled output.

93. A means of generating repetitive pulsed radiation with a multiplicity of discrete wavelengths, comprising:
  means for positioning an optical processing medium in a resonant cavity with reflective elements; and
  means for generating repetitive pulsed radiation from a pulsed laser source in a pump cavity with reflective elements; and
  means for coupling the resonant and pump cavities; and
  means for seeding the optical processing medium with at least some of the discrete wavelengths, such that pulsed radiation with a multiplicity of discrete wavelengths is generated.

* * * * *